May 3, 1960     A. H. WILLINGER     2,935,199
UNDER GRAVEL FILTER DEVICE
Filed Jan. 24, 1958     2 Sheets-Sheet 1
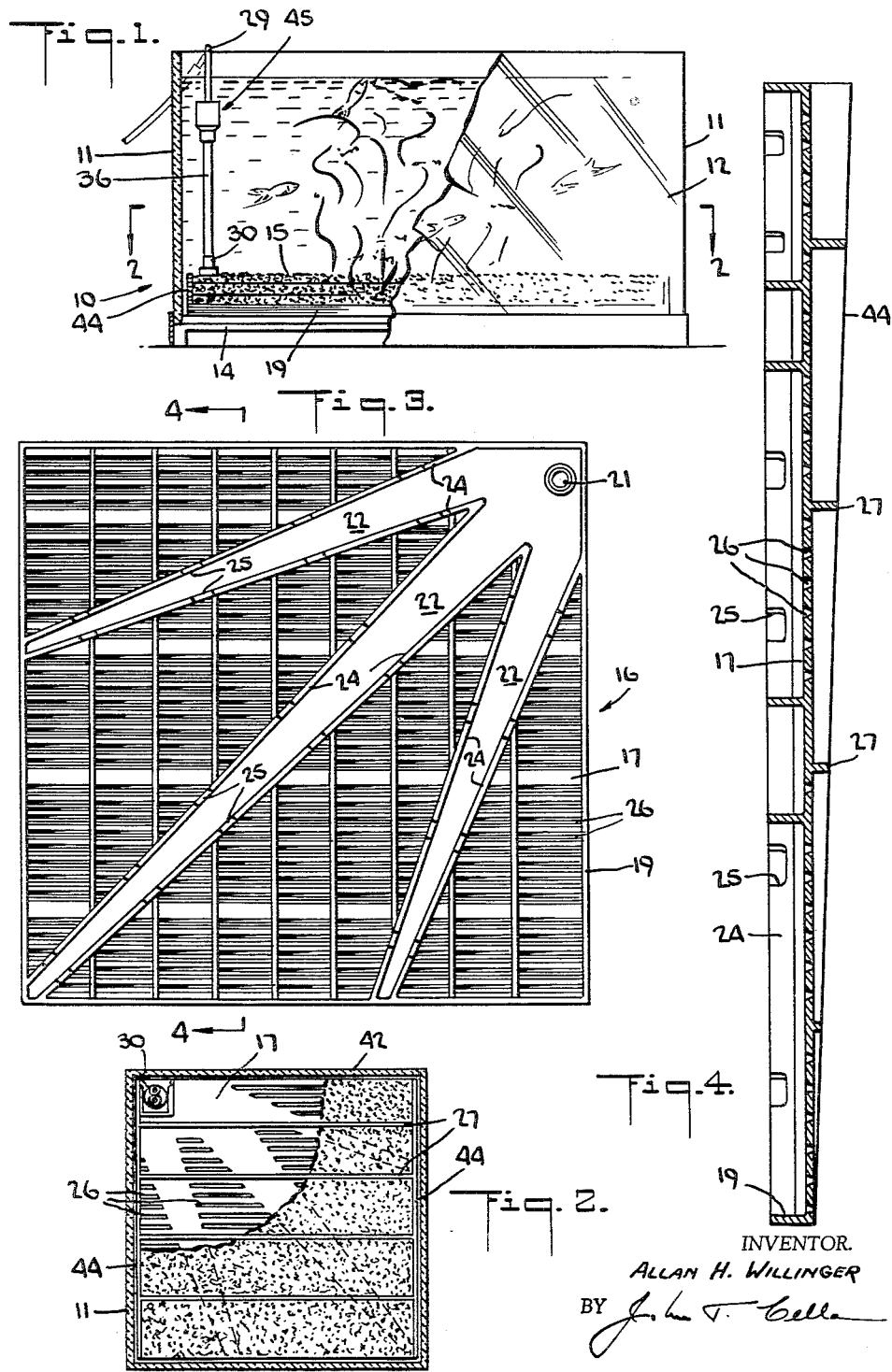
INVENTOR.
ALLAN H. WILLINGER
BY
ATTORNEY

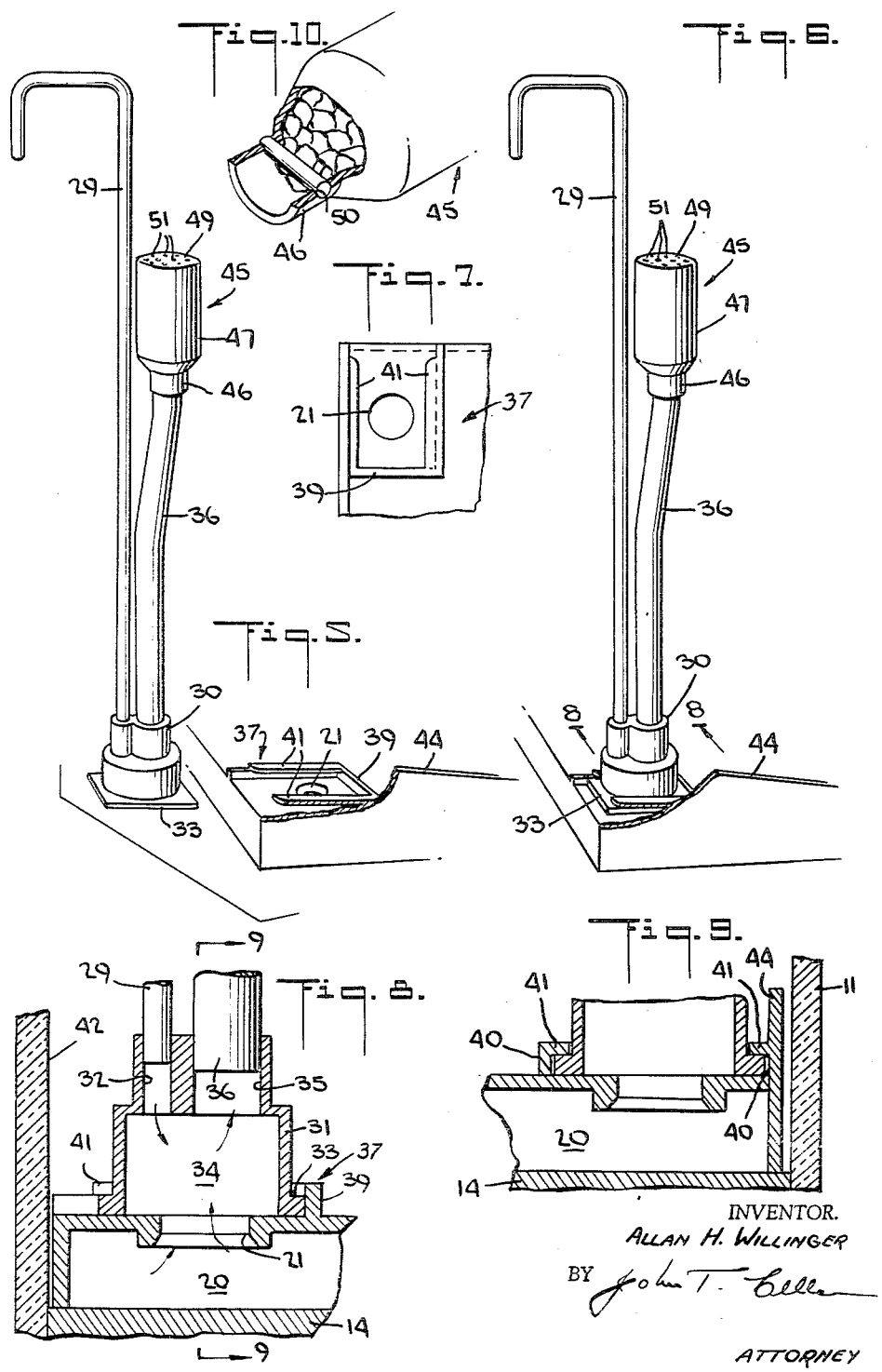

2,935,199

UNDER GRAVEL FILTER DEVICE

Allan H. Willinger, New Rochelle, N.Y.

Application January 24, 1958, Serial No. 710,945

6 Claims. (Cl. 210—169)

This invention relates to filtering devices for aquariums, and the like, and, more particularly, the invention is concerned with such filtering devices as are disposed beneath the surface of the aquarium bed so that the bed itself serves as the filter material.

Heretofore, it has been proposed to employ an under gravel filter device comprising a flat supporting member or plate spaced above the bottom of an aquarium and formed with a plurality of openings for the passage of water but small enough to prevent the gravel from passing through the openings and into the space between the flat member and the aquarium bottom. The water is drawn from the space beneath the flat member and circulated back into the aquarium. In devices of the class described, the aquarium sewage is drawn down into the spaces between the particles of gravel constituting the aquarium bed, where it is trapped and converted by bacteria into non-toxic matter largely in the form of gaseous matter. In this manner, the aquarium bed serves as the filter material and the bacteria converts the sewage, the object of such apparatus being the elimination of the frequent need to change the filter material and aquarium water.

While filter devices of the foregoing class have a certain meritorious objective, those that are known thus far have definite inherent disadvantages. For example, the water is circulated in the aquarium by drawing it from the space or chamber under the plate member by the use of a series of air bubbles rising in an outlet tube in communication with the chamber, the air being supplied by an air pump in a well known manner. In devices of the class described that have been proposed thus far, the suction created by the rising bubbles of air is applied directly to the bottom of the flat member with the result that it acts only on that portion of the aquarium bed in the immediate vicinity of the end of the tube that communicates with the chamber, there being no means provided for applying the suction evenly to the under surface of the flat supporting member or plate. Accordingly, the sewage that falls upon that portion of the aquarium bed to which the suction is not applied, is not treated and decomposes into toxic compounds that soon discolor the aquarium water and are harmful to fish and plant life.

I have conceived by my present invention a novel filter device of the class having a member for supporting an aquarium bed and formed with a plurality of openings of a size to prevent passage therethrough of the particles constituting the bed. In my novel device, the supporting member is spaced above the aquarium bottom to provide a chamber therebetween and suction producing means draw water from the chamber and circulate the same back into the aquarium above the bed.

As a basic feature of my invention, I contribute means communicating with the suction producing means and the chamber to apply the suction produced by the suction producing means uniformly to the openings in the supporting member to draw water from the aquarium uniformly through the bed and into the chamber. As an element of this feature of my invention, I provide passageway means communicating with the suction producing means, and additional means spaced lengthwise of the passageway means establishing communication between the passageway means and the chamber.

As another feature of my invention, the passageway means are formed of adjacent partitions or of inverted channel members having a progressively decreasing cross-section in a direction away from the suction producing means, and having small apertures spaced lengthwise thereof to establish communication between the passageway means and the chamber. To increase the ability of the supporting member to support the bed, the passageway means may extend from the under side of the supporting means to the aquarium bottom thereby serving to stiffen and support the flat supporting member.

As I have already stated, the aquarium sewage is drawn down into the spaces between the particles of gravel constituting the aquarium bed where it is converted by bacteria into gaseous matter. If this gaseous matter is not removed from the water, it will eventually cause the water to cloud.

Accordingly, as an additional feature of my invention, I contribute a disposable degassing unit that is arranged relatively to the filter device to treat the water that leaves the chamber beneath the bed supporting member. This unit may readily be removed and replaced without disturbing the aquarium bed, the supporting member or the suction producing means. The degassing unit is preferably a cartridge for containing a degassing substance, such as activated charcoal, and may, of course, be refilled or disposed of and replaced in its entirety.

Another disadvantage of filter devices of the class described that are presently known to me is the fact that the outlet tube that conducts the water away from the chamber below the supporting member is connected to the supporting member merely by frictional engagement with a collar on the supporting member. Such an engagement is too readily disconnected accidentially as when rearranging the plants in the aquarium or scraping the walls, for example. Should such a disconnection occur, gravel or some of the fish may find their way into the chamber below the supporting member thereby necessitating removal of the filter device and consequent disturbance of the entire bed and all the plant life. In other words the entire contents of the aquarium would have to be removed.

Therefore, as a further feature of my invention, I provide locking means whereby the tube is positively secured against removal from the supporting member. The air tube may of course, be similarly locked.

As a still further feature of my invention, the locking means are so arranged that one of the vertical walls of the aquarium cooperates with the locking means to hold the tube against removal from the desired location when the filter device is properly disposed in the aquarium. Preferably, I provide on the upper surface of the supporting member an upstanding U-shaped rib embracing an aperture in the supporting member and having its open end directed towards one of the aquarium walls. Inturned flanges formed on the parallel arms of the U-shaped rib overlie a flat part fixed to the end of the tube and slidable beneath the inturned flanges to abut the side of the rib opposite the open end and to position the end of the tube opposite the aperture in the supporting member. The rib is positioned adjacent an edge of the supporting member so that when the filter device, with the outlet tube thus connected to it, is disposed in an aquarium, a wall of the aquarium will prevent the flat part fixed to the end of the tube from sliding out from beneath the inturned flanges. Thus, the tube will be positively locked to the supporting member against accidental removal.

I have thus outlined rather broadly the more important features of my invention in order that the detailed description thereof that follows may be better understood, and in order that my contribution to the art may be better appreciated. There are, of course, additional features of my invention that will be described hereinafter and which will form the subject of the claims appended hereto. Those skilled in the art will appreciate that the conception on which my disclosure is based may readily be utilized as a basis for the designing of other structures for carrying out the several purposes of my invention. It is important, therefore, that the claims be regarded as including such equivalent constructions as do not depart from the spirit and scope of my invention, in order to prevent the appropriation of my invention by those skilled in the art.

A preferred embodiment of the invention has been chosen for purposes of illustration and description, and is shown in the accompanying drawing, forming a part of the specification, wherein:

Fig. 1 is an elevational view, partly broken away, of an aquarium equipped with a filter device in accordance with the present invention;

Fig. 2 is a cross sectional view of reduced proportions, taken along the lines 2—2 of Fig. 1 with the aquarium bed partly broken away;

Fig. 3 is a bottom plan view of the filter device illustrated in Fig. 2;

Fig. 4 is a cross sectional view taken along the lines 4—4 of Fig. 3;

Fig. 5 is a fragmentary exploded view, in perspective, illustrating the locking means for securing the outlet tube to the supporting member;

Fig. 6 is a view similar to Fig. 5 but illustrating the parts in assembled relation;

Fig. 7 is a top plan view of the locking means on the supporting member;

Fig. 8 is a cross sectional view taken along the lines 8—8 of Fig. 6;

Fig. 9 is a cross sectional view taken along the lines 9—9 of Fig. 8; and

Fig. 10 is a perspective view, partly broken away, of my degassing unit.

Referring now to the drawing, and more particularly to Fig. 1 thereof, there is shown an aquarium 10 having side walls 11, front wall 12 and a bottom 14. Set into the aquarium 10 on its bottom 14 and supporting the gravel aquarium bed 15, is a filter device 16.

As shown in Figs. 2, 3 and 4, the filter device 16 has a flat plate or supporting member 17 and peripheral depending walls, preferably formed integral with the supporting member, constituting a skirt 19 that serves to hold the supporting member 17 above the bottom 14 of the aquarium to provide a chamber 20 therebetween.

The supporting member 17 has an aperture 21, preferably in one of the rear corners, for a purpose that will be later described. Radiating from this aperture 21 are a plurality of passageways 22 formed by partitions 24 depending from the under surface of the supporting member 17 and extending to the aquarium bottom 14. At this point, it is important to realize that, while it is not essential that the passageways 22 extend from the supporting member to the aquarium bottom, I have chosen to illustrate the passageways in that form since the partitions 24 are thus effective to add support to the supporting member 17. Actually, it will be appreciated that the passageways may be formed of tubular members, for example.

Each pair of partitions 24 that cooperate to form a passageway 22 is so arranged as to converge towards one another in a direction away from the aperture 21. Each of the partitions 24 is also provided with a series of spaced apertures or recesses 25 at the lowermost edges thereof adjacent the aquarium bottom.

The plate supporting member 17 has a plurality of closely spaced, elongate slots 26 in substantially all of its surface area, except that portion of its surface that overlies the passageways 22. These slots 26 permit the passage of water through the supporting member, but are of such width as to prevent the particles that constitute the aquarium bed from passing into the chamber 20.

As shown in Figs. 1, 2 and 4, the upper surface of the supporting member 17 is provided with a series of upstanding ribs 27 of increasing height in a direction from front to rear. These ribs serve to maintain the aquarium bed in a forwardly inclining disposition in the aquarium, as is so often desired.

As I have already indicated, the water from the chamber 20 is drawn, by means of the passageways 22 into that portion of the aquarium above the bed 15. For this purpose, I provide an air tube 29, as seen in Figs. 1, 2, 5, 6 and 8 that may be connected at one end to an air pump (not shown) and at the other end to a double boss 30 formed in upstanding relation to an annular housing 31 and bored as at 32 to receive the air tube. The housing is open at the bottom and provides a compartment 34 that is disposed directly over the aperture 21 in the supporting member so as to be in fluid flow communication with the passageways 22. The housing 31 also has an outwardly directed, flat base portion 33 that merges with the housing at its lower peripheral edge for a purpose to be made known hereinafter.

The double boss 30 has a second bore 35 that also communicates with the compartment 34 and receives one end of a tube 36, the other end of which terminates below the level of the water in the aquarium.

In the operation of the structure that I have thus far described, air is pumped into the air tube 29 and enters the compartment 34 and the tube 36. The air forms bubbles and draws water up through the aperture 21, into the compartment 34 and the tube 36 where it is elevated and enters the aquarium above the bed 15 from the upper end of the tube. The water passing through the aperture 21 is, of course, drawn by suction from the chamber 20, through the recesses 25 and the passageways 22. Since the suction at the aperture 21 is distributed by the passageways 22 and recesses 25, it will be seen that the same may be uniformly applied to all of the slots 26 in the supporting member 17 to draw water uniformly down through the aquarium bed 15 above the slots.

I have indicated heretofore that, as a part of my invention, I contribute locking means whereby the tube 36 is positively secured against removal from the supporting member. An embodiment of these locking means is generally designated by the reference numeral 37 and is best illustrated in Figs. 5 to 9. Adjacent the rear edge of the supporting member 17, I provide an upstanding rib 39 that is generally U-shaped and embraces the aperture 21. The parallel arms 40 of the rib 39 have inwardly directed flanges 41 formed on the upper edges thereof.

In placing my novel locking means to use, the flat base portion 33, that is effective as a flange on the housing 31, is inserted in sliding relation between the parallel arms 40 of the upstanding rib 39 and with its side edges disposed beneath the inturned flanges 41 to position the compartment 34 directly above the aperture 21, as best shown in Figs. 8 and 9. The filter device is then placed bodily upon the bottom 14 of the aquarium so that the open side of the upstanding U-shaped rib faces the rear wall 42 of the aquarium, which wall prevents the base portion 33 from sliding out from beneath the flanges 41. The flanges 41, of course, prevent the base portion from being moved upwardly, wherefore the tube 36 is positively locked to the supporting member 17. Since I employ a double boss 30, the air tube 29 will be similarly locked, but in constructions wherein the air tube bends into outlet tube 36 directly, it will be understood by those skilled in the art that a single boss may be employed. By reason of the foregoing construction, it will be noted that the connections are permanent by which the tubes 29 and 36 are secured in the bores 32 and 35.

While I have described my upstanding rib 39 as being preferably U-shaped, it will be seen that, as shown in Figs. 1, 4, 5, 6 and 9, I also provide in the present embodiment, upstanding rib members 44 on the side edges of the supporting member, and that these members taper upwardly rearwardly in accordance with the same grade as is established for the ribs 27. These rib members 44 help to confine the aquarium bed particles above the supporting member. Accordingly, for convenience, I have chosen to employ one of these members as one of the arms 40 of the upstanding rib 39, as shown, although it will be understood that the rib 39 may be completely separate from the rib members 44, if desired.

The construction that I have described thus far will function to draw sewage into the spaces between the particles constituting the aquarium bed where they will be effectively converted by bacteria into non-toxic compounds that are carried off by the flow of water. Since a great portion of these non-toxic compounds is in gaseous form, and will soon cloud the aquarium water, it is essential to complete filtration that means be provided to cooperate with the structure thus far defined for removal of the gaseous matter.

Accordingly, I provide, as a part of my present novel concept, a cartridge 45, as shown in Figs. 1, 5, 6 and 10. This cartridge has a neck portion 46 and a body portion 47. The neck portion 46 is so proportioned as to frictionally engage the free end of tube 36 for securement thereon and may, of course, frictionally engage the outside or the inside of the tube end. The body portion 47 is somewhat wider than the neck portion and has an end wall 49 provided with a plurality of openings 51 for the passage therethrough of water, but small enough to contain a degassing substance such as activated charcoal within the cartridge. The neck portion is also provided with means for retaining the degassing substance while allowing water to pass through the cartridge, and for this purpose, a wall similar to wall 49 may be recessed in the neck, but, as shown in Fig. 10, I have chosen to insert merely a bar 50 of sufficient width to retain the particles of degassing substance in the cartridge.

As gas laden water moves upwardly through the tube 36, it will pass through the cartridge 45 wherein the water will be treated by the degassing substance, and will then pass through the end wall 49 and into the aquarium above the bed 15. It will be seen that the cartridge 45, because of the small openings 51 also serves to break up the relatively large air bubbles that also rise in the tube 36 and ultimately reach the surface of the water, thereby providing effective aeration for the water. It is also important to note that the cartridge may be readily removed from the tube 36 and either replaced with a new cartridge, or refilled and replaced, without disturbing the supporting member, the aquarium bed or the tubes 29 or 36, and in fact, without even interrupting the operation of the remainder of the apparatus.

From the foregoing description, it will be seen that my novel contribution provides a filter device that applies suction uniformly to the aquarium bed utilizing that bed to the fullest extent as a filter medium. It will also be seen that I provide a novel means of locking the necessary conduits to the part of my construction that is disposed under the bed, and that I provide a disposable or refillable degassing unit that cooperates with the remainder of the construction to provide complete filtration and that may be serviced without disturbing the remainder of the device.

I believe that the construction and operation of my novel filter device will now be understood, and that the advantages of my contribution will be fully appreciated by those persons skilled in the art.

I claim:

1. In a combination of the class described, an aquarium having a substantially vertical wall, a filter device having a surface portion angularly disposed relatively to said aquarium wall and provided with an aperture adjacent said aquarium wall for the passage of water through said surface portion, a conduit having an open end for receiving water passing through said aperture, said conduit having a base portion at said end, and an upstanding U-shaped rib on said surface portion having inturned flanges in overlying sliding relation to said base portion and cooperating with said aquarium wall to maintain the open end of the conduit opposite the opening in said surface portion.

2. In a combination of the class described, an aquarium having a substantially vertical wall, a filter device having a surface portion the edge of which is adapted for disposition in angular juxtapositon relatively to said aquarium wall, an aperture in said surface portion adjacent its edge for the passage of water through said surface portion, a conduit for conducting water passing through said aperture, said conduit having a base member affixed to its end and formed with a flat portion overextending the perimeter of the conduit, and locking means associated with said surface portion formed to slidingly receive said flat portion of said base member and having a part adapted to overlie the flat portion of said base member to position the end of said conduit in juxtaposed relation to said aperture in said surface portion, said locking means cooperating with said aquarium wall when the edge of said surface portion is disposed adjacent said aquarium wall to retain the end of said conduit against removal from its position relatively to said aperture.

3. In a combination of the class described, an aquarium having a substantially vertical wall, a filter device having a surface angularly disposed relatively to said wall, an aperture in said surface of said device adjacent the aquarium wall, and means on said surface cooperating with the aquarium wall to lock a conduit in position with one of its ends juxtaposed over said aperture, said means comprising upstanding U-shaped rib means embracing said aperture and having an open end directed towards the aquarium wall, inturned flange means formed on the parallel arms of said U-shaped rib means, and a flanged collar fixed to the end of said conduit, the flange on said collar being slidable beneath said inturned flange means to underlie the same and to position the end of said conduit opposite said aperture and the flange on said collar thus being positioned within the embrace of said rib means and being locked in that position when said filter device is disposed relatively to the aquarium wall to position the open end of said rib means adjacent the aquarium wall.

4. In a device of the class described, a member for supporting an aquarium bed, said member having a plurality of water pervious openings of a size to prevent passage therethrough of the particles constituting the aquarium bed, means for spacing said member above the bottom of an aquarium tank to provide a chamber therebetween, an aperture in said member, suction producing means communicating with said chamber through said aperture for drawing water from said chamber, a plurality of pairs of partitions radiating from said aperture and extending down from the underside of said member to the bottom of the aquarium tank to lend support to said member, the partitions of each pair of partitions tapering towards each other to form passageway means of progressively decreasing cross-section in a direction away from said suction producing means, and openings in said partitions spaced lengthwise of said passageway means establishing communication between said passageway means and said chamber, whereby the suction produced by said suction producing means is distributed through said spaced openings to said chamber for substantially uniform application to said openings in said supporting member.

5. In a device of the class described, a member for supporting an aquarium bed, said member having a plurality of openings of a size to prevent passage therethrough of the particles constituting the aquarium bed, means depending from said member for spacing said member above the bottom of an aquarium tank to provide a chamber therebetween, an aperture in said member, suction producing means communicating with said aperture and thus with said chamber for drawing water from said chamber, passageway means in said chamber communicating with said suction producing means through said aperture and radiating from said aperture to zones of said chamber remote from said aperture, and openings spaced lengthwise of said passageway means establishing communication between said passageway means and said chamber whereby the suction produced by said suction producing means is distributed to said chamber for application substantially uniformly to said openings in said supporting member.

6. In a device of the class described, a member for supporting an aquarium bed, said member having a plurality of openings of a size to prevent passage therethrough of the particles constituting the aquarium bed, means depending from said member for spacing said member above the bottom of an aquarium tank to provide a chamber therebetween, an aperture in said member, suction producing means communicating with said aperture and thus with said chamber for drawing water from said chamber, passageway means in said chamber communicating with said aperture and radiating from said aperture to zones of said chamber remote from said aperture, said passageway means each having a progressively decreasing cross-section in a direction away from said aperture, and openings spaced lengthwise of said passageway means establishing communication between said passageway means and said chamber whereby the suction produced by said suction producing means is distributed to said chamber for application substantially uniformly to said openings in said supporting member.

References Cited in the file of this patent

UNITED STATES PATENTS

| | | |
|---|---|---|
| 580,793 | Mitchell | Apr. 13, 1897 |
| 667,005 | Davis | Jan. 29, 1901 |
| 1,572,398 | Leopold | Feb. 9, 1926 |
| 2,148,770 | Mittendorf | Feb. 28, 1939 |
| 2,178,635 | Jackes | Nov. 7, 1939 |
| 2,324,791 | McLoughlin et al. | July 20, 1943 |
| 2,357,755 | Moll | Sept. 5, 1944 |
| 2,525,497 | Monfried | Oct. 10, 1950 |
| 2,636,473 | Schwartz et al. | Apr. 28, 1953 |
| 2,674,574 | Pettas | Apr. 6, 1954 |
| 2,748,075 | Hovlid | May 29, 1956 |
| 2,765,275 | Aaron | Oct. 2, 1956 |
| 2,820,548 | Marcus et al. | Jan. 21, 1958 |

FOREIGN PATENTS

| | | |
|---|---|---|
| 644,693 | Great Britain | Oct. 18, 1950 |
| 869,190 | Germany | Mar. 5, 1953 |